US011663366B2

(12) United States Patent
Elenes

(10) Patent No.: US 11,663,366 B2
(45) Date of Patent: *May 30, 2023

(54) SIDE-CHANNEL ATTACK MITIGATION FOR SECURE DEVICES WITH EMBEDDED SENSORS

(71) Applicant: Silicon Laboratories Inc., Austin, TX (US)

(72) Inventor: Javier Elenes, Austin, TX (US)

(73) Assignee: Silicon Laboratories Inc., Austin, TX (US)

( * ) Notice: Subject to any disclaimer, the term of this patent is extended or adjusted under 35 U.S.C. 154(b) by 88 days.

This patent is subject to a terminal disclaimer.

(21) Appl. No.: 17/362,104

(22) Filed: Jun. 29, 2021

(65) Prior Publication Data

US 2021/0326488 A1 Oct. 21, 2021

Related U.S. Application Data

(63) Continuation of application No. 16/687,959, filed on Nov. 19, 2019, now Pat. No. 11,087,030.

(51) Int. Cl.
*G06F 21/75* (2013.01)
*G06F 21/72* (2013.01)
(Continued)

(52) U.S. Cl.
CPC ............ *G06F 21/755* (2017.08); *G06F 21/72* (2013.01); *H01L 23/576* (2013.01); *H04L 9/002* (2013.01);
(Continued)

(58) Field of Classification Search
CPC ................. G06F 21/755; G06F 21/556; G06F 2221/2125; H04L 9/002; H04L 63/1416; H04L 63/1433; H01L 23/576
See application file for complete search history.

(56) References Cited

U.S. PATENT DOCUMENTS 7,587,044 B2  9/2009 Kocher et al.
7,634,083 B2  12/2009 Kocher et al.
(Continued)

OTHER PUBLICATIONS

"Enhancing Sensor Network Security with Improved Internal Hardware Design"—Wang et al Apr. 12, 2019 (Year: 2019).*

(Continued)

*Primary Examiner* — Randy A Scott
(74) *Attorney, Agent, or Firm* — Egan, Enders & Huston LLP.

(57) ABSTRACT

Embodiments include cryptographic circuits having isolated operation with respect to embedded sensor operations to mitigate side-channel attacks. A cryptographic circuit, a sensor, and an analog-to-digital converter (ADC) circuit are integrated into an integrated circuit along with a cryptographic circuit. A sensed signal is output with the sensor, and the sensed signal is converted to digital data using the ADC circuit. Further, cryptographic data is generated using one or more secret keys and the cryptographic circuit. The generation of the cryptographic data has isolated operation with respect to the operation of the sensor and the ADC circuit. The isolated operation mitigates side-channel attacks. The isolated operation can be achieved using power supply, clock, and/or reset circuits for the cryptographic circuit that are electrically isolated from similar circuits for the sensor and ADC circuit. The isolated operation can also be achieved using time-division multiplex operations. Other variations can also be implemented.

21 Claims, 6 Drawing Sheets

(51) Int. Cl.
*H01L 23/00* (2006.01)
*H04L 29/06* (2006.01)
*H04L 9/00* (2022.01)
*H04L 9/40* (2022.01)

(52) U.S. Cl.
CPC .... H04L 63/1416 (2013.01); *H04L 2209/805* (2013.01)

(56) References Cited

U.S. PATENT DOCUMENTS

| | | | |
|---|---|---|---|
| 8,879,724 B2 | 11/2014 | Kocher et al. | |
| 9,160,763 B2* | 10/2015 | Cohn | H04L 63/1441 |
| 10,615,989 B2 | 4/2020 | Kreft | |
| 10,952,069 B1* | 3/2021 | Mohamed | H04W 12/121 |
| 2015/0195082 A1* | 7/2015 | Han | G06F 1/30 |
| | | | 713/189 |
| 2018/0262327 A1* | 9/2018 | Jain | H04L 12/40013 |
| 2019/0014117 A1 | 1/2019 | Li et al. | |
| 2021/0150068 A1 | 5/2021 | Elenes | |

OTHER PUBLICATIONS

"Enhancing Sensor Network Security with Improved Internal Hardware Design"—Wang et al, MDPI, Mar. 2019 https://www.mdpi.com/1424-8220/19/8/1752 (Year: 2019).*
"Side Channels In the Cloud: Isolation Challenges, Attacks, and Countermeasures"—Bazm et al, HAL Archives—Ouvertes, Sep. 22, 2012 "Side Channels In the Cloud: Isolation Challenges, Attacks, and Countermeasures"—Bazm et al., HAL Archives—Ouvertes, Sep. 22, 2017 (Year: 2017).*
Wang et al., "Enhancing Sensor Network Security With Improved Internal Hardware Design", Sensors, 19 pgs. (Mar. 5, 2019).
Wikipedia, "Advanced Encryption Standard", 12 pgs. (Oct. 2019).
Bazm et al., "Side Channels In the Cloud: Isolation Challenges, Attacks, And Couternmeasures", HAL Archives—Duvertes, Sep. 22, 2017, 14 pgs.
Google Search, "Side Channel Attack Cryptography Isolation", Jun. 2021, 2pgs.
Google Search, "Enhancing Sensor Network Security With Improved Internal Hardware Design", Jun. 2021, 2 pgs.

* cited by examiner

SIDE-CHANNEL ATTACK MITIGATION FOR SECURE DEVICES WITH EMBEDDED SENSORS

This application is a continuation of pending U.S. patent application Ser. No. 16/687,959, filed on Nov. 19, 2019 and entitled "Side-Channel Attack Mitigation For Secure Devices With Embedded Sensors", which are expressly incorporated herein by reference.

TECHNICAL FIELD

The technical field relates to integrated circuits with cryptographic circuits and embedded sensors including wireless internet-of-things (IoT) devices.

BACKGROUND

Integrated circuits (ICs) that operate as internet-of-things (IoT) devices can include cryptographic functions in addition to other functions. For example, an IoT device may have a radio to allow wireless communications. IoT devices may also include sensors, actuators, and/or other circuitry that allow the IoT device to perform one or more functions within the environment within which the IoT devices are deployed. For example, IoT devices can be used to provide a system of autonomous interconnected computing, sensing, and/or actuating devices within an environment such as a home or business. Further, the IoT devices can each have a unique identifier and have the ability to transmit and/or receive data over a network including the IoT devices.

IoT devices face significant privacy and security challenges. To deal with these privacy and security challenges, IoT devices often include cryptographic (crypto) circuits that are integrated on the same IC with other operational circuitry. For example, many IoT devices store one or more secret keys and perform cryptographic operations with these keys. Further, prior solutions have created trusted memory zones within an integrated circuit where secret keys are stored and crypto operations are performed, and these trusted zones are separate from non-trusted memory zones where application code is stored and other circuitry performs non-crypto operations.

If the secret keys are compromised, however, multiple attacks become possible. For example, an attacker can take over control of the device and direct it to act in a way that causes financial, physical, or other harm to people or infrastructures associated with the environment within which the devices are deployed. Further, an attacker with the keys can also impersonate the device within a network to gain access to private or confidential data on the network or stored within other connected devices.

A variety of indirect side-channel techniques have been used by attackers to determine secret keys being used within cryptographic circuits on IoT devices or other secure IC devices. For example, many IoT devices are implemented as system-on-a-chip (SoC) integrated circuits including cryptographic circuits integrated with embedded radios, microcontrollers, and other circuits. Such embedded IC devices are vulnerable to side-channel attacks. Side-channel attacks sidestep the mathematical properties of the cryptographic system by focusing on information gained from the physical operation of the embedded IC device. For example, attackers can extract secret keys from microcontrollers by measuring power consumption or electromagnetic radiation while the device is performing cryptographic operations. These side-channel attacks, however, require direct physical access to the device. As such, the scope of these traditional side-channel attacks is limited to small numbers of embedded devices where direct physical access is available to the attackers.

For IoT devices with embedded sensors, however, a new class of side-channel attack exists that does not require physical access to the device. The attack relies on the operation of integrated sensors and related ADC circuits on the device to collect side-channel information. In particular, this attack relies upon leakage of crypto information between the cryptographic circuits and the integrated sensors and/or ADCs such that operation of the cryptographic circuits including the secret keys can be determined from results generated by the sensor and/or ADC circuits. This side-channel attack does not require that the attacker have physical access and take over the device. Rather, this side-channel attack can be initiated remotely by the attacker by sending legitimate commands to the device. For example, the attacker can send a command to obtain a sensor reading and another command that triggers usage of a secret key within cryptographic circuits. The overlapping operation of the sensor and cryptographic operations can cause exploitable side-channel information about the secret key to leak into the sensor related data. Thus, with such IoT devices including embedded sensors, a side-channel attack can be made that exploits side-channel information without having physical access to the device. Further, this new class of attack can easily scale by orders of magnitude, potentially compromising a large number of devices.

FIG. 1A (Prior Art) is a block diagram of an example embodiment 100 for a prior integrated circuit 102 that can be compromised using a side-channel attack based upon overlapping operation of one or more sensors 112 and related ADC circuits 108 with cryptographic circuit 106. The integrated circuit 102 also includes a controller 104, memory 110, a radio 116, and power supply circuit 118. The radio 116 includes transmit circuits and receive circuits, and the radio 116 is coupled to an antenna 115 and communicates wirelessly with a network 125. The one or more embedded sensors 112 detect environmental inputs 114 such as temperature, pressure, ambient light, mechanical actuators, and/or other environmental inputs that are desired to be detected by the integrated circuit 102. ADC circuits 108 convert analog inputs from the embedded sensors 112 into digital data that is provided to the controller 104. The cryptographic circuit 106 performs one or more cryptographic operations using one or more secret keys 107. For one embodiment, the secret keys 107 are stored within trusted memory associated with the cryptographic circuit 106. The memory 110 is used to facilitate operations of the integrated circuit 102 and can store data and/or code for the controller 104, the cryptographic circuit 106, and/or other circuit blocks within the integrated circuit 102. The power supply circuit 118 receives power from an external voltage supply and provides internal supply voltages to the circuit blocks within the integrated circuit 102. It is also noted that the integrated circuit 102 could also have a network interface circuit instead of or in addition to the radio 116 that provides a network connection to the network 125.

An attacker, as represented by the external device 120, can compromise the security of the cryptographic circuit 106 by determining the secret keys 107 through side-channel attacks based upon overlapping operation with the sensors 112 and/or the ADC circuits 108. The attacking device 120 communicates commands 122 through the network 125 to the integrated circuit 102. These commands 122 include sensor-related commands to cause the controller 104 to activate one or more of the sensors 112 to collect sensor readings and to generate digital sensor data through ADC circuits 108. The commands 122 also include crypto-related commands to cause the controller 104 to activate the cryptographic circuit 106 to perform cryptographic operations using one or more of the secret keys 107. The overlapping operation of the sensors 112 and/or the ADC circuits 108 with the cryptographic circuit 106 causes crypto information 124 to leak into the supply voltages being generated and provided by the power supply circuit 118 to the sensors 112 and/or the ADC circuits 108. This crypto information 124 can then be detected by the attacking device 120 through the sensor data reported by the controller 104 through the network 125 in response to the sensor-related commands within commands 122.

FIG. 1B (Prior Art) is a flow diagram of an example embodiment 150 where an attacking device 120 compromises the security of cryptographic circuit 106 through a side-channel attack based upon the overlapping operation with the sensors 112 and/or the ADC circuits 108. As indicated by arrow 122A, the attacking device 120 sends commands for sensor operations and cryptographic operations to the integrated circuit 102 that are received by controller 104. The controller 104 then activates a sensor operation with respect to one of a sensor 112 as represented by arrow 152. The controller 104 also activates as crypto operation with respect to cryptographic circuit 106 as indicated by arrow 154. The sensor 112 performs a detection cycle 156 and generates a sensor signal that is sent to ADC circuits 108 as indicated by arrow 158. The ADC circuits 108 performs a conversion cycle 160 to convert the sensed signal to digital data that is communicated to the controller 104 as indicated by arrow 162. This digital data is then returned as requested data to the attacking device 120 as indicated by arrow 122B. The cryptographic circuit 106 performs a crypto cycle 164 using secret keys 107 that overlaps with the operation of the sensor 112 and/or the ADC circuits 108, and the cryptographic circuit 106 communicates resulting cryptographic data to the controller 104 as indicated by arrow 166. As described above, this overlapping operation causes crypto information 124 to leak into the operation of the sensor 112 and/or the ADC circuits 108 thereby affecting the sensed signal and/or the digital data generated by those circuits. This crypto information 124 can then be detected by the attacking device 120 from the digital data that is communicated back by the controller 104. Over time and multiple such command cycles, the attacking device 120 can determine the secret keys 107 and thereby compromise the integrated circuit 102 and/or the network 125.

SUMMARY OF THE INVENTION

Systems and methods are disclosed for side-channel attack mitigation for secure devices with embedded sensors. Embodiments include cryptographic circuits having isolated operation with respect to embedded sensor operations to mitigate side-channel attacks. A cryptographic circuit, one or more sensors, and analog-to-digital converter (ADC) circuits are integrated into an integrated circuit along with the cryptographic circuit. For one embodiment, a sensed signal is output with an embedded sensor, and the sensed signal is converted to digital data using an ADC circuit. Further, cryptographic data is generated using one or more secret keys and a cryptographic circuit. As described herein, the generation of the cryptographic data has isolated operation with respect to the operation of the sensor to output the sensed signal and the operation of the ADC circuit to convert the sensed signal to digital data. The isolated operation mitigates side-channel attacks. For one embodiment, this isolated operation is achieved using a power supply circuit, a clock circuit, and/or a reset circuit for the cryptographic circuit that are electrically isolated from similar circuits for the sensor and ADC circuit. For one embodiment, the isolated operation is achieved using time-division multiplex operations for the cryptographic circuit with respect to the sensor and ADC circuit. Other features and variations can also be implemented, and related systems and methods can be utilized as well.

For one embodiment, an integrated circuit having side-channel attack mitigation is disclosed including a sensor having a sensed signal as an output, an analog-to-digital converter (ADC) circuit coupled to receive the sensed signal and to output digital data representing the sensed signal, and a cryptographic circuit having cryptographic data as an output based upon one or more secret keys, where operation of the cryptographic circuit is isolated with respect to operation of the sensor and operation of the ADC circuit to mitigate side-channel attacks.

In additional embodiments, the integrated circuit also includes a radio configured to communicate with a network to transmit the digital data representing the sensed signal. In further additional embodiments, the integrated circuit also includes a network interface circuit configured to communicate with a network to transmit the digital data representing the sensed signal.

In additional embodiments, the operation of the cryptographic circuit is electrically isolated with respect to operation of the sensor and operation of the ADC circuit to mitigate side-channel attacks. In further embodiments, the integrated circuit also includes a first power supply circuit coupled to distribute a supply voltage to the cryptographic circuit and a second power supply circuit coupled to distribute supply voltages to the sensor and the ADC circuit, and the first power supply circuit is electrically isolated from the second power supply circuit. In further embodiments, the first power supply circuit includes a shunt regulator. In still further embodiments, the integrated circuit includes a first clock circuit and a first reset circuit coupled to the cryptographic circuit and includes a second clock circuit and a second reset circuit coupled to the sensor and the ADC circuit, where the first clock circuit and the first reset circuit are electrically isolated from the second clock circuit and the second reset circuit.

In additional embodiments, the operation of the cryptographic circuit is isolated in time with respect to operation of the sensor and operation of the ADC circuit to mitigate side-channel attacks. In further embodiments, the integrated circuit also includes a controller coupled to the sensor, the ADC circuit, and the cryptographic circuit; and the controller is configured to cause time-division multiplex operation for the cryptographic circuit with respect to the sensor and the ADC circuit based upon commands received from an external device for sensor operations and cryptographic operations. In still further embodiments, the controller is configured to activate the cryptographic operations only after the sensor operations have completed.

For one embodiment, an internet-of-things (IoT) device is disclosed including a radio coupled to an antenna to communicate with a network, a sensor having a sensed signal as an output, an analog-to-digital converter (ADC) circuit coupled to receive the sensed signal and to output digital data representing the sensed signal, a cryptographic circuit having cryptographic data as an output based upon one or more secret keys, and a controller. The controller is coupled to the sensor, the ADC circuit, and the cryptographic circuit; and the controller is configured to receive commands from an external device through the network for sensor operations and cryptographic operations. The radio, the sensor, the ADC circuit, the cryptographic circuit, and the controller are integrated within an integrated circuit; and operation of the cryptographic circuit is isolated with respect to operation of the sensor and operation of the ADC circuit to mitigate side-channel attacks.

In additional embodiments, the operation of the cryptographic circuit is electrically isolated with respect to operation of the sensor and operation of the ADC circuit to mitigate side-channel attacks. In further embodiments, the IoT device includes a first power supply circuit coupled to distribute a supply voltage to the cryptographic circuit and a second power supply circuit coupled to distribute supply voltages the sensor and the ADC circuit, and the first power supply circuit are electrically isolated from the second power supply circuit. In still further embodiments, the IoT device includes a first clock circuit and a first reset circuit coupled to the cryptographic circuit and includes a second clock circuit and a second reset circuit coupled to the sensor and the ADC circuit, where the first clock circuit and the first reset circuit are electrically isolated from the second clock circuit and the second reset circuit.

In additional embodiments, the operation of the cryptographic circuit is isolated in time with respect to operation of the sensor and operation of the ADC circuit to mitigate side-channel attacks. In further embodiments, the controller is configured to cause time-division multiplex operation for the cryptographic circuit with respect to the sensor and the ADC circuit based upon the commands for sensor operations and cryptographic operations.

For one embodiment, a method to mitigate side-channel attacks is disclosed including outputting a sensed signal with a sensor integrated within an integrated circuit, converting the sensed signal to digital data using an analog-to-digital converter (ADC) circuit integrated within the integrated circuit, generating cryptographic data using one or more secret keys and a cryptographic circuit integrated within the integrated circuit, and isolating the generating with respect to the outputting and the converting to mitigate side-channel attacks.

In additional embodiments, the method also includes communicating with a network using at least one of a radio integrated within the integrated circuit or a network interface circuit to transmit the digital data representing the sensed signal.

In additional embodiments, the isolating includes electrically isolating operation of the cryptographic circuit with respect to operation of the sensor and operation of the ADC circuit to mitigate side-channel attacks. In further embodiments, the electrically isolating includes distributing a supply voltage to the cryptographic circuit using a first power supply circuit and distributing supply voltages to the sensor and the ADC circuit using a second power supply circuit coupled, where the first power supply circuit is electrically isolated from the second power supply circuit. In still further embodiments, the electrically isolating also includes supplying a first clock signal to the cryptographic circuit using a first clock circuit, supplying a first reset signal to the cryptographic circuit using a first reset circuit, supplying a second clock signal to the sensor and the ADC circuit using a second clock circuit, and supplying a second reset signal to the sensor and the ADC circuit using a second reset circuit, where the first clock circuit and the first reset circuit are electrically isolated from the second clock circuit and the second reset circuit.

In additional embodiments, the isolating includes isolating in time operation of the cryptographic circuit with respect to operation of the sensor and operation of the ADC circuit to mitigate side-channel attacks. In further embodiments, the isolating in time includes receiving, with a controller integrated within the integrated circuit, commands from an external device for sensor operations and cryptographic operations and causing, with the controller, time-division multiplex operation for the cryptographic circuit with respect to the sensor and the ADC circuit based upon the commands. In further embodiments, the method includes activating the cryptographic operations only after the sensor operations have completed.

Other features and variations can also be implemented, and related systems and methods can be utilized, as well.

DESCRIPTION OF THE DRAWINGS

It is noted that the appended drawings illustrate only example embodiments of the invention and are, therefore, not to be considered limiting of its scope, for the invention may admit to other equally effective embodiments.

DETAILED DESCRIPTION OF THE INVENTION

Systems and methods are disclosed for side-channel attack mitigation for secure devices with embedded sensors. Disclosed embodiments include cryptographic circuits integrated with one or more sensors and related analog-to-digital converter (ADC) circuits. As described herein, the cryptographic circuits have isolated operation with respect to the sensors and ADC circuits so that attackers cannot obtain side-channel information due to leakage of crypto information during operation of the cryptographic circuits. Various features can be implemented for the embodiments described herein, and related systems and methods can be utilized as well.

As described herein, disclosed embodiments prevent an attacker from leveraging integrated on-chip sensors and related ADC circuits to measure side-channel information that can potentially reveal secret keys used in cryptographic operations. As such, the disclosed embodiments prevent side-channel attacks from being launched remotely through commands directed to network-connected devices having embedded sensors. As described herein, the disclosed embodiments isolate operation of the cryptographic circuits from operation of the integrated sensors and ADC circuits. This isolated operation can be implemented as electrical isolation, logical isolation, or other isolation and/or combinations of these isolation techniques. For example, electrical isolation can be achieved by using a power supply circuit for the cryptographic circuits that is dedicated, unequal, and separate from a power supply circuit used for the sensors converters and ADCs. Clock and/or reset circuits can similarly be electrically isolated. For one embodiment, a decoupled voltage regulator is used to power sensors and related ADCs and a separate, dedicated shunt regulator is used to power the cryptographic circuits. Logical isolation can be achieved, for example, by time-division multiplexing the operations of the cryptographic circuit with respect to the operation of the sensors and ADC circuits. Other variations can also be implemented while still taking advantage of the isolation techniques described herein.

Figure 2:
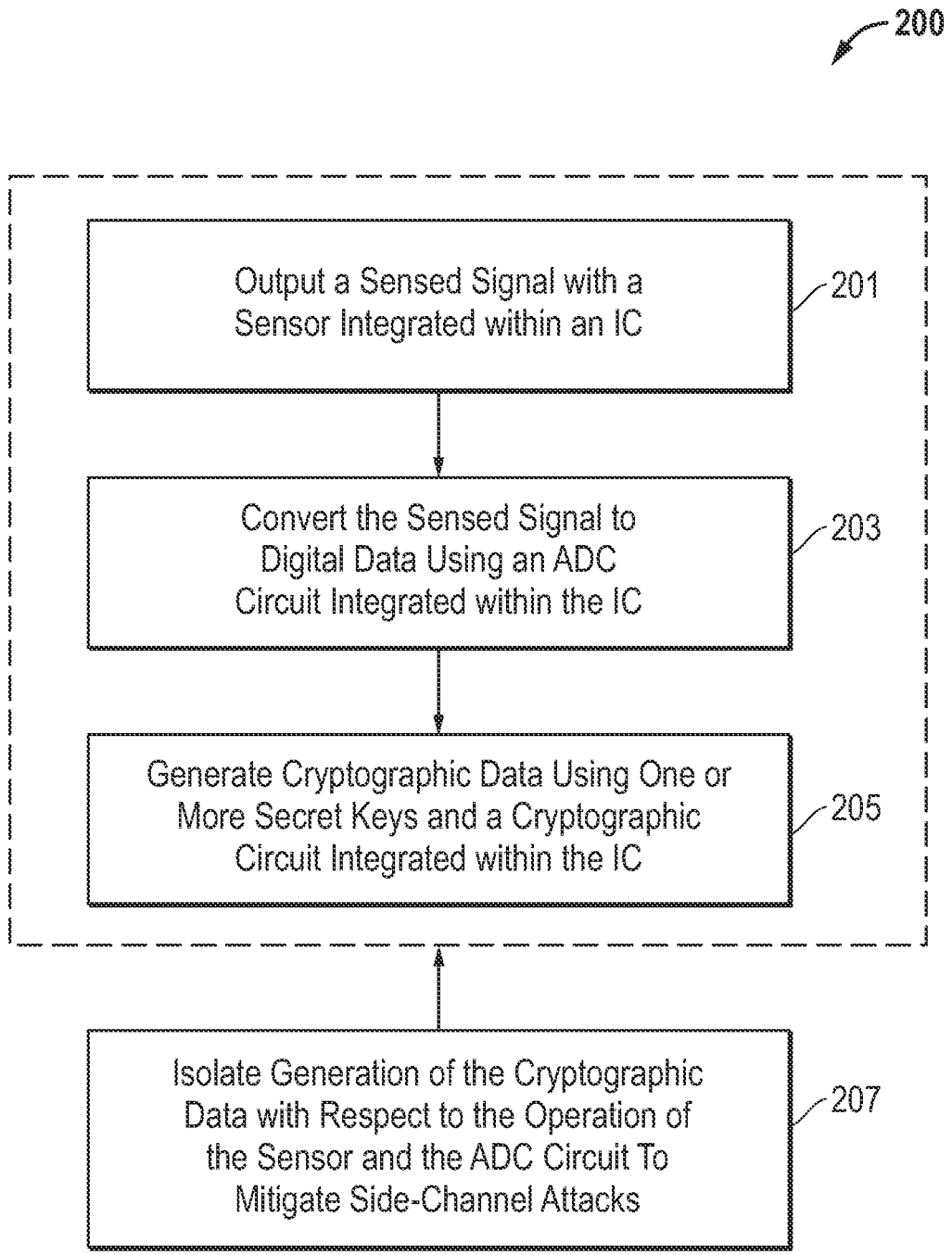
FIG. 2 is a process diagram of an example embodiment where cryptographic circuits have isolated operations with respect to sensor and ADC circuit operations to mitigate side-channel attacks.

FIG. 2 is a process diagram of an example embodiment 200 where cryptographic circuits have isolated operations with respect to sensor and ADC circuit operations to mitigate side-channel attacks. In block 201, a sensed signal is output with a sensor integrated within an integrated circuit. In block 203, the sensed signal is converted to digital data using an analog-to-digital converter (ADC) circuit integrated within the integrated circuit. In block 205, cryptographic data is generated using one or more secret keys and a cryptographic circuit integrated within the integrated circuit. As represented by block 207, the generation of the cryptographic data has isolated operation with respect to the operation of the sensor to output the sensed signal and operation of the ADC circuit to convert the sensed signal to digital data. This isolated operation mitigates side-channel attacks. It is noted that different and/or additional functions can also be implemented while still taking advantage of the isolation techniques described herein.

Figure 3:
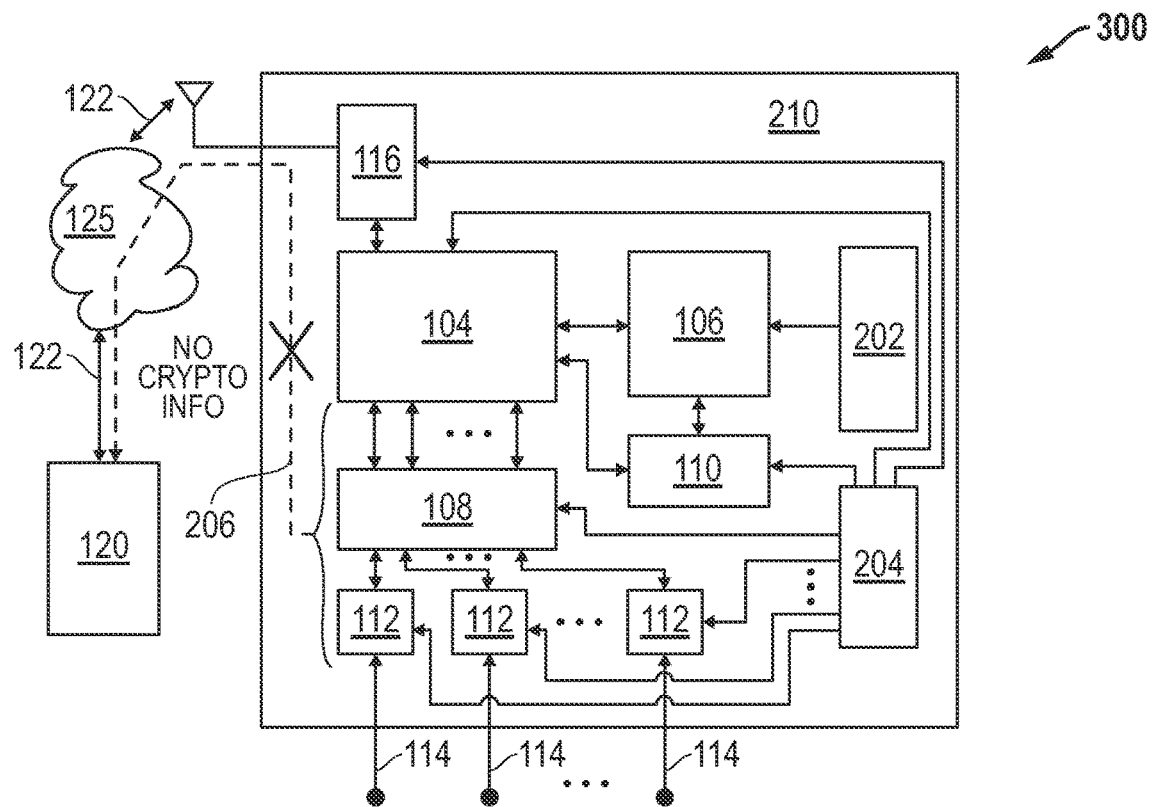
FIG. 3 is a block diagram of an example embodiment for an integrated circuit that electrically isolates the operation of cryptographic circuits from the operation of one or more integrated sensors and related ADC circuits thereby preventing or helping to eliminate side-channel attacks.

FIG. 3 is a block diagram of an example embodiment 300 for an integrated circuit 210 that electrically isolates the operation of cryptographic circuit 106 from the operation of one or more integrated sensors 112 and related ADC circuits 108 thereby preventing or helping to eliminate side-channel attacks. As with integrated circuit 102 of FIG. 1A (Prior Art), the integrated circuit 210 also includes a controller 104, memory 110, and a radio 116. The radio 116 includes transmit circuits and receive circuits, and the radio 116 is coupled to an antenna 115 and communicates wirelessly with a network 125. The one or more embedded sensors 112 detect environmental inputs 114 such as temperature, pressure, ambient light, mechanical actuators, and/or other environmental inputs that are desired to be detected by the integrated circuit 210. ADC circuits 108 convert analog inputs from the embedded sensors 112 into digital data that is provided to the controller 104. The cryptographic circuit 106 performs one or more cryptographic operations using one or more secret keys 107. For one embodiment, the secret keys 107 are stored within trusted memory associated with the cryptographic circuit 106. The memory 110 is used to facilitate operations of the integrated circuit 210 and can store data and/or code for the controller 104, the cryptographic circuit 106, and/or other circuit blocks within the integrated circuit 210. It is also noted that the integrated circuit 210 could also have a network interface circuit instead of or in addition to the radio 116 that provides a network connection to the network 125.

Figure 1A:
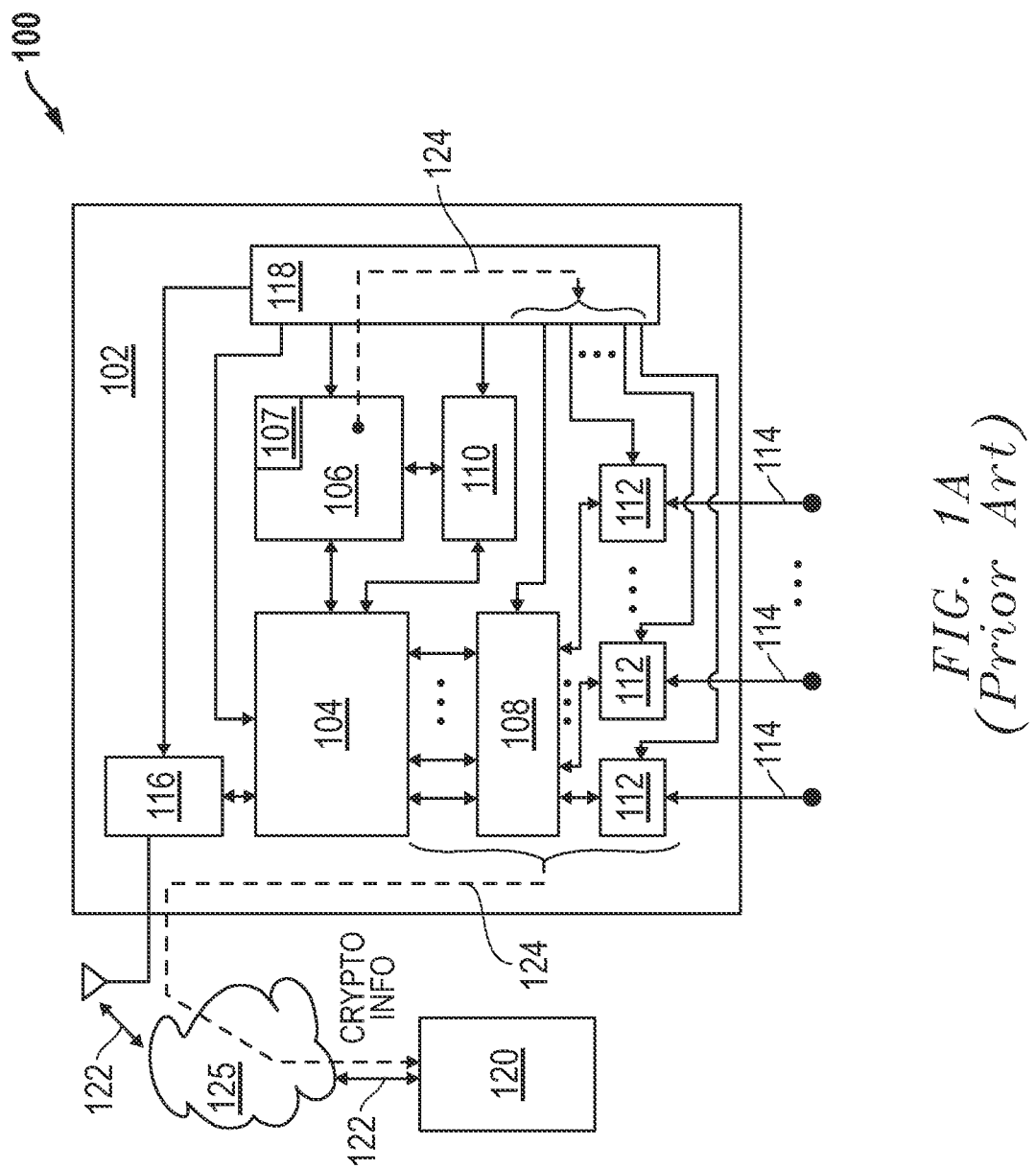
FIG. 1A (Prior Art) is a block diagram of an example embodiment for a prior integrated circuit that can be compromised using a side-channel attack based upon overlapping operation of one or more sensors and related ADC circuits with cryptographic circuits.

In contrast with integrated circuit 102 of FIG. 1A (Prior Art), integrated circuit 210 includes a power supply circuit 202 that is dedicated to the cryptographic circuit 106 and separate from the power supply circuit 204 for the sensors 112 and the related ADC circuits 108. The power supply circuit 202 receives power from an external voltage supply and provides a supply voltage to the cryptographic circuit 106. The power supply circuit 204 receives power from an external voltage supply and provides supply voltages to the sensors 112 and the ADC circuits 108. The power supply circuit 204 can also provide supply voltages to other circuit blocks such as the radio 116, the controller 104, and the memory 110.

Because the power supply circuit 202 is electrically isolated from power supply circuit 204, an attacker, as represented by device 120, is not able to compromise the security of the cryptographic circuit 106 through side-channel attacks based upon power supply leakage from overlapping operation of the sensors 112 and/or the ADC circuits 108. As described above with respect to FIG. 1A (Prior art), the attacking device 120 attempts such an attack by communicating commands 122 through the network 125 to the integrated circuit 102. These commands 122 include sensor-related commands attempting to cause the controller 104 to activate one or more of the sensors 112 to collect sensor readings and to generate digital sensor data through ADC circuits 108. The commands 122 also include crypto-related commands attempting to cause the controller 104 to activate the cryptographic circuit 106 to perform cryptographic operations using one or more of the secret keys 107. For the embodiment of FIG. 3, however, the overlapping operation of the sensors 112 and/or the ADC circuits 108 with the cryptographic circuit 106 does not cause crypto information to leak into the supply voltages being generated and provided by the power supply circuits 202/204 because power supply circuit 202 is electrically isolated from the power supply circuit 204. Thus, as indicated by arrow 206, no crypto information can be detected by the attacking device 120 through the sensor data reported by the controller 104 through the network 125 in response to the sensor-related commands within commands 122.

Figure 4:
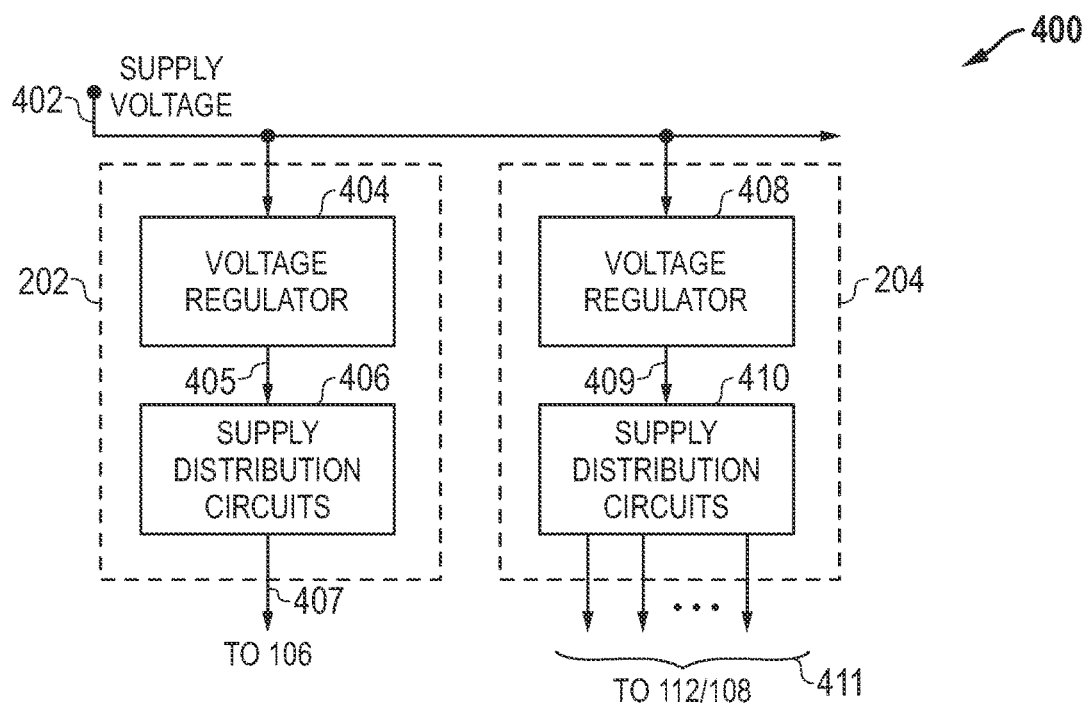
FIG. 4 is a block diagram of example embodiments for separate and electrically isolated power supply circuits as shown in the embodiment of FIG. 3.

FIG. 4 is a block diagram of an example embodiment 400 for the separate and electrically isolated power supply circuits 202 and 204 of FIG. 3. The power supply circuit 202 receives an external supply voltage 402. A voltage regulator 404 for the power supply circuit 202 receives this external supply voltage 402 and generates a regulated voltage 405. This regulated voltage 405 is then received by supply distribution circuits 406, and the supply distribution circuits 406 distribute supply voltage 407 to the cryptographic circuit 106. Similarly, a voltage regulator 408 for the power supply circuit 204 receives the external supply voltage 402 and generates a regulated voltage 409. This regulated voltage 409 is then received by supply distribution circuits 410, and the supply distribution circuits 410 distribute supply voltages 411 to the sensors 112, the ADC circuits 108, and/or other circuit blocks within the integrated circuit 210. Because the power supply circuit 202 is electrically isolated from the power supply circuit 204, leakage of crypto information does not occur due to overlapping operation of the cryptographic circuit 106 with the sensors 112 and the ADC circuit 108.

For one embodiment, the voltage regulator 404 for the power supply circuit 202 that distributes a supply voltage 407 to the cryptographic circuit 106 can be implemented as a shunt regulator. Although shunt regulators are often undesirable in IoT devices due to higher (but constant) current consumption, their limited use as the voltage regulators for the crypto power supply circuit 202 makes them a viable option for the embodiments described herein. Other regulator circuits could also be used while still taking advantage of the isolation techniques described herein.

Figure 5:
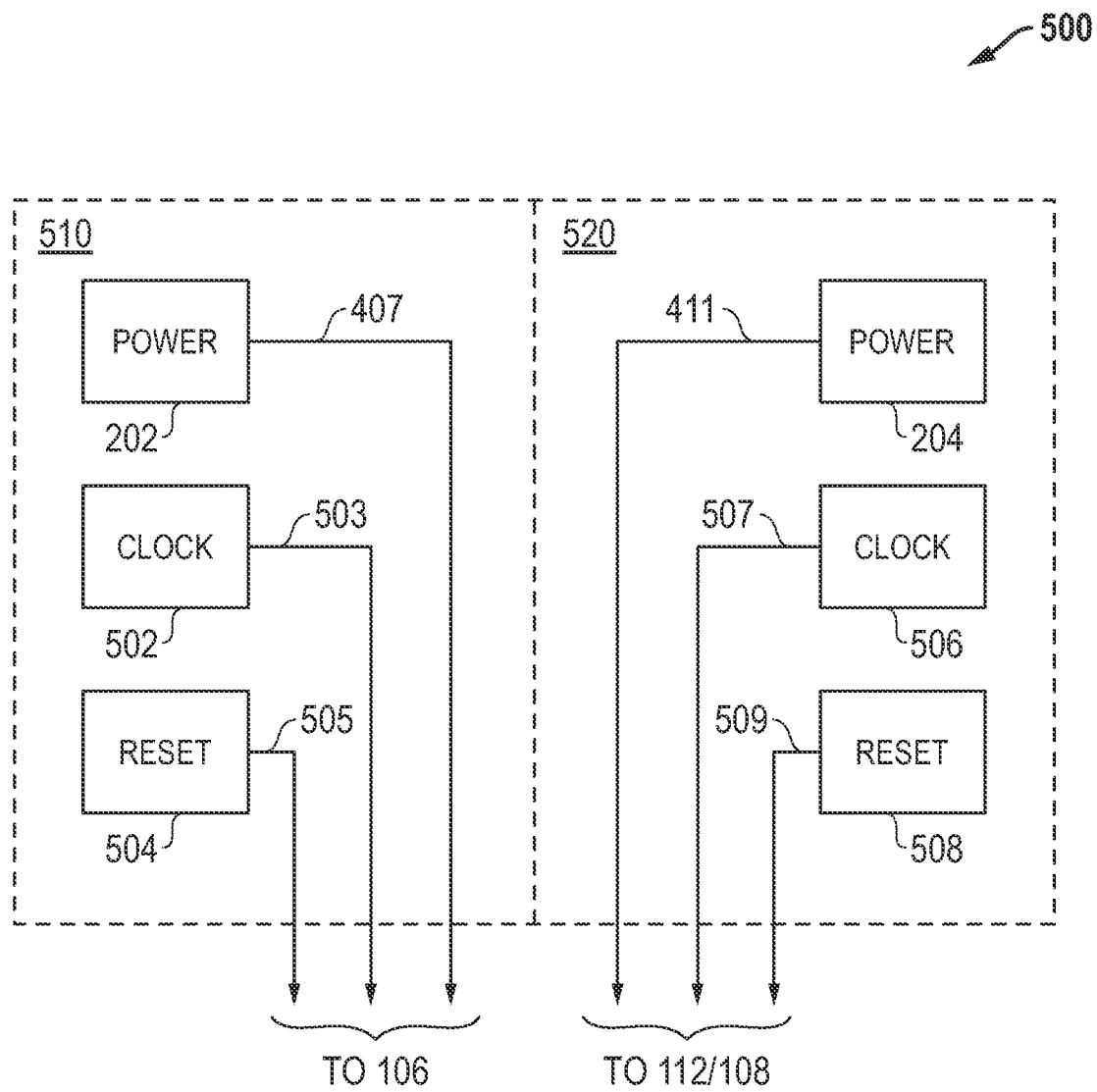
FIG. 5 is a block diagram of an example embodiment where additional circuits, such as clock and reset circuits, for the cryptographic circuits are electrically isolated within the integrated circuit.

FIG. 5 is a block diagram of an example embodiment 500 where additional circuits for the cryptographic circuit 106 are electrically isolated within the integrated circuit 210. For the example embodiment 500, a clock circuit 502 and a reset circuit 504 are also electrically isolated within a first circuit region 510. The clock circuit 502 generates one or more clock signals 503, and the reset circuit 504 generates one or more reset signals 505. The clock and reset signals 503/505 are output to the cryptographic circuit 106 along with the power supply voltage 407 from the power supply circuit 202. This first circuit region 510 is electrically isolated from the second circuit region 520. A clock circuit 506 and a reset circuit 508 are included within the second circuit region 520 along with the powers supply circuit 204. The clock circuit 506 generates one or more clock signals 507, and the reset circuit 508 generates one or more reset signals 509. The clock and reset signals 507/509 are output along with the power supply voltages 411 to the sensors 112, the ADC circuits 108, and/or other circuit blocks within the integrated circuit 210. In addition to or separate from the circuits shown in embodiment 500, other digital or analog circuits that provide signals to the cryptographic circuit 106 can also be electrically isolated to help eliminate side-channel attacks based upon the leakage of crypto information into the operation of the sensors 112 and/or ADC circuits 108. Other variations can also be implemented.

As described above, in addition or instead of the electrical isolation of circuits provided by the embodiments of FIGS. 3-5, logical isolation can also be used to prevent leakage of crypto information into the operation of the sensors 112 and/or ADC circuits 108. This logical isolation can be implemented, for example, by time-division multiplexing the operation of the cryptographic circuit 106 with respect to the operation of the sensors 112 and the ADC circuits 108.

Figure 1B:
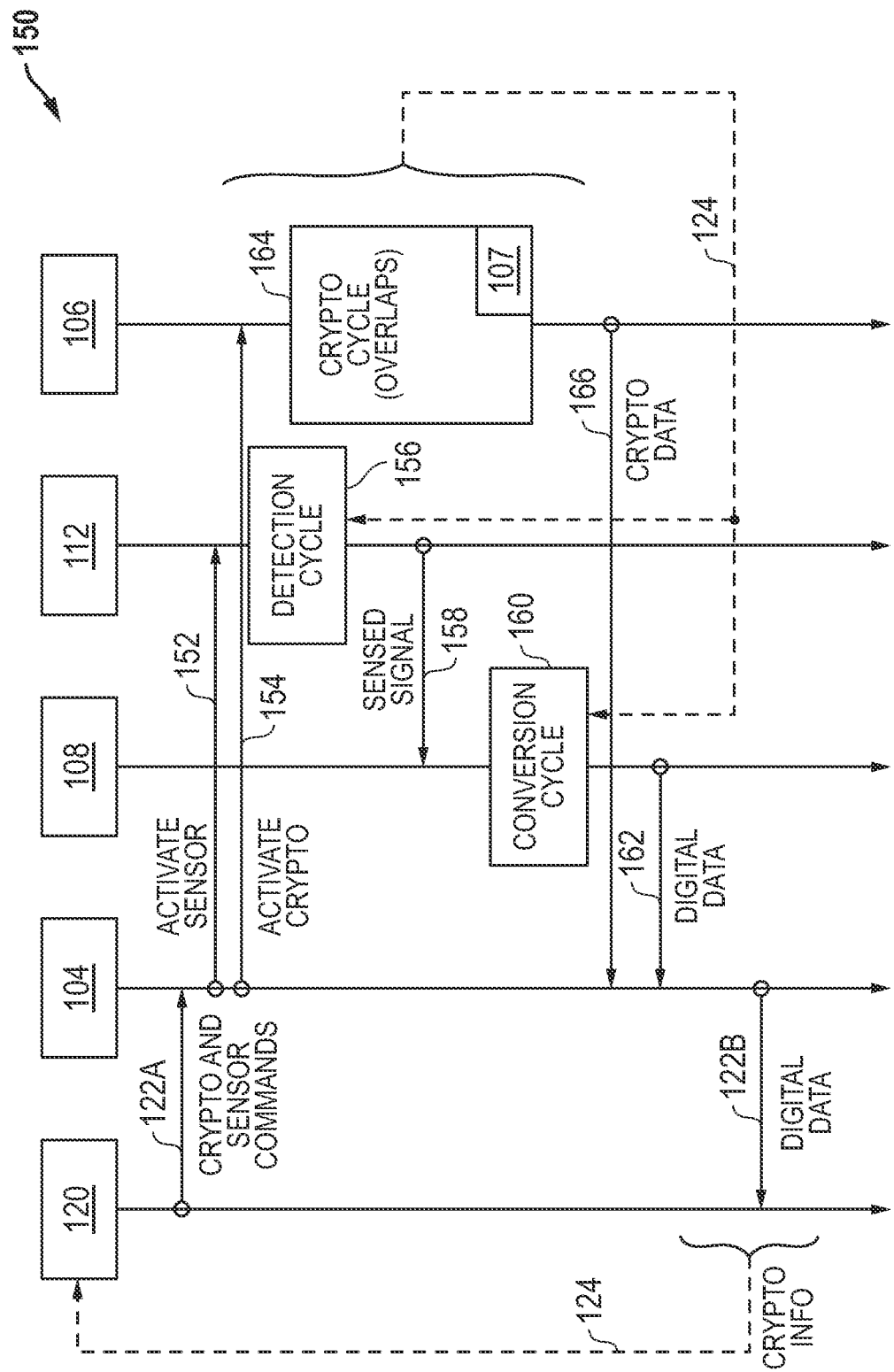
FIG. 1B (Prior Art) is a flow diagram of an example embodiment where an attacking device compromises the security of cryptographic circuits through a side-channel attack based upon overlapping operation with sensors and/or ADC circuits.
Figure 6:
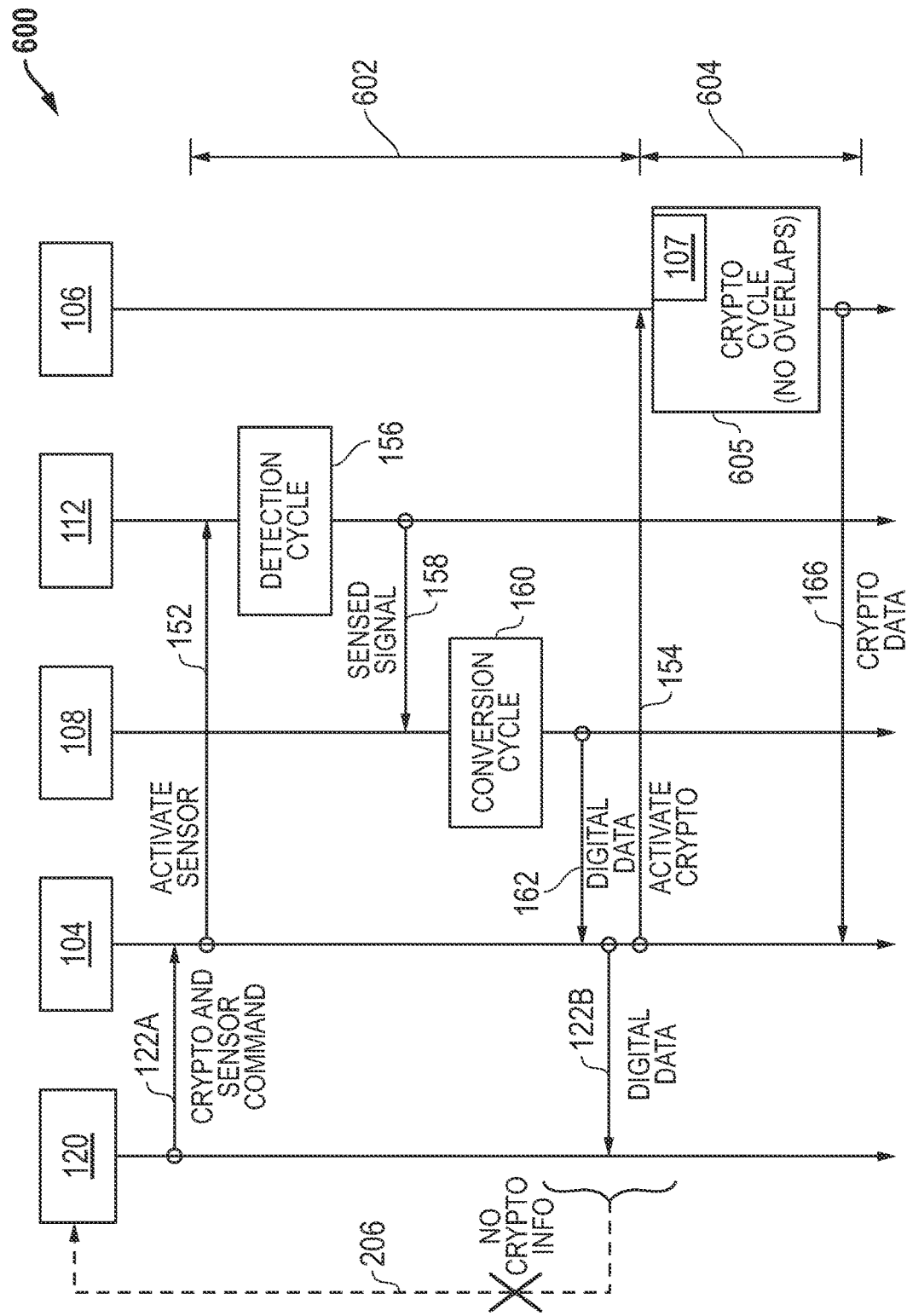
FIG. 6 is a flow diagram of an example embodiment where operation of the cryptographic circuits is isolated in time with respect to the operation of the sensors and the ADC circuits through time-division multiplex operation.

FIG. 6 is a flow diagram of an example embodiment 600 where operation of the cryptographic circuit 106 is isolated in time with respect to the operation of the sensors 112 and the ADC circuits 108 through time-division multiplex operation. Due to this time-division multiplex operation, an attacking device 120 is not able to compromise the security of cryptographic circuit 106 through a side-channel attack based upon the overlapping operation with the sensors 112 and/or the ADC circuits 108. As indicated by arrow 122A, the attacking device 120 sends commands for sensor operations and crypto operations to the integrated circuit 102 that are received by controller 104. In contrast to the embodiment of FIG. 1B (Prior Art), however, the controller 104 does not activate overlapping operation of the cryptographic circuit 106 with the sensors 112 and the ADC circuits 108. Rather, time-division multiplex operations are used. For the example embodiment 600, the controller 104 first activates a sensor operation with respect to one of a sensor 112 as represented by arrow 152. The sensor 112 performs a detection cycle 156 and generates a sensor signal that is sent to ADC circuits 108 as indicated by arrow 158. The ADC circuits 108 perform a conversion cycle 160 to generate digital data that is communicated to the controller 104 as indicated by arrow 162. This digital data is then returned as requested data to the attacking device 120 as indicated by arrow 122B. After completion of the sensor operation, the controller activates a crypto operation with respect to cryptographic circuit 106 as indicated by arrow 154. The cryptographic circuit 106 performs a crypto cycle 164 using secret keys 107, and this crypto cycle does not overlap with the operation of the sensor 112 and/or the ADC circuits 108. The cryptographic circuit 106 communicates resulting crypto data to the controller 104 as indicated by arrow 166. It is also noted that the crypto operation can also be activated first followed by the sensor operation. As such, the crypto operation is only activated after the sensor operation has completed, or the sensor operation is only activated after the crypto operation has completed.

Because there is no overlapping operation between the cryptographic circuit 106 with respect to the sensors 112 and the ADC circuits 108, crypto information does not leak into the operation of the sensor 112 and/or the ADC circuits 108. As indicated by arrow 206, therefore, no crypto information can then be detected by the attacking device 120 from the digital data that is communicated back by the controller 104. It is further noted that circuits related to the operation of the cryptographic circuit 106, such as clock circuit 502 and reset circuit 504 in FIG. 5, can also be controlled and activated using time-division multiplex operations so that their operations do not overlap with operations of the sensors 112 and ADC circuits 108. Other variations could also be implemented while still taking advantage of time-division multiplex operation described herein.

It is noted that the functional blocks, devices, and/or circuitry described herein can be implemented using hardware, software, or a combination of hardware and software. For one embodiment, one or more programmable integrated circuits are programmed to provide the functionality described herein. For example, one or more processors (e.g., microprocessor, microcontroller, central processing unit, etc.), programmable logic devices (e.g., complex programmable logic device (CPLD)), field programmable gate array (FPGA), etc.), and/or other programmable integrated circuits can be programmed with software or other programming instructions to implement the functionality of a proscribed plasma process recipe. It is further noted that the software or other programming instructions can be stored in one or more non-transitory computer-readable mediums (e.g., memory storage devices, FLASH memory, DRAM memory, reprogrammable storage devices, hard drives, floppy disks, DVDs, CD-ROMs, etc.), and the software or other programming instructions when executed by the programmable integrated circuits cause the programmable integrated circuits to perform the processes, functions, and/or capabilities described herein. Other variations could also be implemented.

Further modifications and alternative embodiments of this invention will be apparent to those skilled in the art in view of this description. It will be recognized, therefore, that the present invention is not limited by these example arrangements. Accordingly, this description is to be construed as illustrative only and is for the purpose of teaching those skilled in the art the manner of carrying out the invention. It is to be understood that the forms of the invention herein shown and described are to be taken as the presently preferred embodiments. Various changes may be made in the implementations and architectures. For example, equivalent elements may be substituted for those illustrated and described herein, and certain features of the invention may be utilized independently of the use of other features, all as would be apparent to one skilled in the art after having the benefit of this description of the invention.

What is claimed is:

1. An integrated circuit having side-channel attack mitigation, comprising:
   a sensor having a sensed signal as an output;
   an analog-to-digital converter (ADC) circuit coupled to the sensor to receive the sensed signal from the sensor, convert the sensed signal to digital data, and to output the digital data representing the sensed signal; and
   a cryptographic circuit having cryptographic data as an output generated using one or more secret keys;
   wherein the sensor, the ADC circuit and the cryptographic circuit are integrated within the integrated circuit; and
   wherein operation of the cryptographic circuit is electrically isolated or isolated in time from operation of the sensor and operation of the ADC circuit in order to mitigate side-channel attacks.

2. The integrated circuit of claim 1, further comprising a radio configured to communicate with a network to transmit the digital data representing the sensed signal.

3. The integrated circuit of claim 1, further comprising a network interface circuit configured to communicate with a network to transmit the digital data representing the sensed signal.

4. The integrated circuit of claim 1, wherein electrically isolating the operation of the cryptographic circuit with respect to the operation of the sensor and the operation of the ADC circuit mitigates side-channel attacks by preventing cryptographic information from leaking into supply voltages provided to the cryptographic circuit, the sensor or the ADC circuit.

5. The integrated circuit of claim 4, further comprising a first power supply circuit coupled to distribute a supply voltage to the cryptographic circuit and a second power supply circuit coupled to distribute supply voltages to the sensor and the ADC circuit, the first power supply circuit being electrically isolated from the second power supply circuit.

6. The integrated circuit of claim 5, wherein the first power supply circuit comprises a shunt regulator.

7. The integrated circuit of claim 5, further comprising:
   a first clock circuit and a first reset circuit coupled to the cryptographic circuit; and
   a second clock circuit and a second reset circuit coupled to the sensor and the ADC circuit;
   wherein the first clock circuit and the first reset circuit are electrically isolated from the second clock circuit and the second reset circuit.

8. The integrated circuit of claim 1, further comprising a controller coupled to the sensor, the ADC circuit, and the cryptographic circuit, and wherein the controller is configured to cause time-division multiplex operation for the cryptographic circuit with respect to the sensor and the ADC circuit based upon commands received from an external device for sensor operations and cryptographic operations.

9. The integrated circuit of claim 8, wherein the controller is configured to activate the cryptographic operations only after the sensor operations have completed.

10. An internet-of-things (IoT) device, comprising:
    a radio coupled to an antenna to communicate with a network;
    a sensor having a sensed signal as an output;
    an analog-to-digital converter (ADC) circuit coupled to the sensor to receive the sensed signal from the sensor, convert the sensed signal to digital data, and to output the digital data representing the sensed signal;
    a cryptographic circuit having cryptographic data as an output generated using one or more secret keys; and
    a controller coupled to the sensor, the ADC circuit, and the cryptographic circuit, the controller being configured to receive commands from an external device through the network for sensor operations and cryptographic operations;
    wherein the radio, the sensor, the ADC circuit, the cryptographic circuit, and the controller are integrated within an integrated circuit; and
    wherein operation of the cryptographic circuit is electrically isolated or isolated in time from operation of the sensor and operation of the ADC circuit in order to mitigate side-channel attacks.

11. The IoT device of claim 10, wherein electrically isolating the operation of the cryptographic circuit with respect to the operation of the sensor and the operation of the ADC circuit mitigates side-channel attacks by preventing cryptographic information from leaking into supply voltages provided to the cryptographic circuit, the sensor or the ADC circuit.

12. The IoT device of claim 11, further comprising a first power supply circuit coupled to distribute a supply voltage to the cryptographic circuit and a second power supply circuit coupled to distribute supply voltages to the sensor and the ADC circuit, the first power supply circuit being electrically isolated from the second power supply circuit.

13. The IoT device of claim 12, further comprising:
    a first clock circuit and a first reset circuit coupled to the cryptographic circuit; and
    a second clock circuit and a second reset circuit coupled to the sensor and the ADC circuit;
    wherein the first clock circuit and the first reset circuit are electrically isolated from the second clock circuit and the second reset circuit.

14. The IoT device of claim 10, wherein the controller is configured to cause time-division multiplex operation for the cryptographic circuit with respect to the sensor and the ADC circuit based upon the commands for sensor operations and cryptographic operations.

15. A method to mitigate side-channel attacks, comprising:
    outputting a sensed signal with a sensor integrated within an integrated circuit;
    converting the sensed signal to digital data using an analog-to-digital converter (ADC) circuit integrated within the integrated circuit;
    generating cryptographic data using one or more secret keys and a cryptographic circuit integrated within the integrated circuit; and
    isolating the generating of the cryptographic data from the outputting of the sensed signal and the converting of the sensed signal to the digital data in order to mitigate side-channel attacks;
    wherein the isolating comprises electrically isolating, or isolating in time, operation of the cryptographic circuit from operation of the sensor and operation of the ADC circuit in order to mitigate side-channel attacks.

16. The method of claim 15, further comprising communicating with a network using at least one of a radio integrated within the integrated circuit or a network interface circuit to transmit the digital data representing the sensed signal.

17. The method of claim 15, wherein the electrically isolating the operation of the cryptographic circuit with respect to operation of the sensor and operation of the ADC circuit mitigates side-channel attacks by preventing cryptographic information from leaking into supply voltages provided to the cryptographic circuit, the sensor or the ADC circuit.

18. The method of claim 15, wherein the electrically isolating comprises:
distributing a supply voltage to the cryptographic circuit using a first power supply circuit dedicated to the cryptographic circuit; and
distributing supply voltages to the sensor and the ADC circuit using a second power supply circuit coupled to the sensor and the ADC circuit;
wherein the first power supply circuit is electrically isolated from the second power supply circuit.

19. The method of claim 18, wherein the electrically isolating further comprises:
supplying a first clock signal to the cryptographic circuit using a first clock circuit;
supplying a first reset signal to the cryptographic circuit using a first reset circuit;
supplying a second clock signal to the sensor and the ADC circuit using a second clock circuit; and
supplying a second reset signal to the sensor and the ADC circuit using a second reset circuit;
wherein the first clock circuit and the first reset circuit are electrically isolated from the second clock circuit and the second reset circuit.

20. The method of claim 15, wherein the isolating in time comprises:
receiving, with a controller integrated within the integrated circuit, commands from an external device for sensor operations and cryptographic operations; and
causing, with the controller, time-division multiplex operation for the cryptographic circuit with respect to the sensor and the ADC circuit based upon the commands.

21. The method of claim 20, further comprising activating the cryptographic operations only after the sensor operations have completed.

* * * * *